(12) United States Patent
Liu et al.

(10) Patent No.: US 10,516,489 B1
(45) Date of Patent: Dec. 24, 2019

(54) UNDERWATER WIRELESS COMMUNICATION APPARATUS AND COMMUNICATION METHOD THEREOF

(71) Applicant: Industrial Technology Research Institute, Hsinchu (TW)

(72) Inventors: Yen-Liang Liu, New Taipei (TW); Cheng-You Ho, Changhua County (TW); Hui-Ru Shen, Hsinchu (TW); I-Cheng Lu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/226,664

(22) Filed: Dec. 20, 2018

(30) Foreign Application Priority Data

Nov. 15, 2018 (TW) .............................. 107140523 A

(51) Int. Cl.
*H04B 10/80* (2013.01)
*H04B 10/116* (2013.01)
(Continued)

(52) U.S. Cl.
CPC .......... *H04B 10/80* (2013.01); *H04B 10/116* (2013.01); *G01S 13/86* (2013.01); *G01S 17/10* (2013.01); *H04B 13/02* (2013.01)

(58) Field of Classification Search
CPC ...... H04B 10/80; H04B 10/116; H04N 5/235; G01S 17/89; G01S 17/95; G01H 9/00;
(Continued)

(56) References Cited

U.S. PATENT DOCUMENTS 6,693,561 B2 * 2/2004 Kaplan ................... G01S 17/10
340/555
7,251,196 B1 * 7/2007 Antonelli ................. G01H 9/00
367/149
(Continued)

FOREIGN PATENT DOCUMENTS

CN 203032903 7/2013
CN 203087311 7/2013
(Continued)

OTHER PUBLICATIONS

Firat Eren et al.,"Position, Orientation and Velocity Detection of Unmanned Underwater Vehicles (UUVs) Using an Optical Detector Array," Sensors 2017, Jul. 29, 2017, pp. 1-18.
(Continued)

*Primary Examiner* — Abbas H Alagheband
(74) *Attorney, Agent, or Firm* — JCIPRNET

(57) ABSTRACT

An underwater communication apparatus includes a light transmitting device to transmits a first communication light and a light receiving device to receive a second communication light. Further, a light identification device is used to detect a reference pattern in two dimensions, which is set on a node communication apparatus, to obtain a detection pattern. The light transmitting device and the light receiving device respectively corresponding to the light identification device are set at two relative locations. A power apparatus is used to drive the underwater communication apparatus. A control/monitor apparatus obtains the detection pattern from the light identification device and analyze a difference state between the reference pattern and the detection pattern. According to the difference state, it controls the power apparatus to move the underwater communication apparatus to a location for the detection pattern and the reference pattern being two dimensionally aligned.

32 Claims, 10 Drawing Sheets

(51) Int. Cl.
*G01S 17/10* (2006.01)
*G01S 13/86* (2006.01)
*H04B 13/02* (2006.01)

(58) Field of Classification Search
CPC .... H01S 3/10; H01S 3/30; H04M 1/02; H02P 9/04; G01B 9/02
USPC .......................................................... 398/104
See application file for complete search history.

(56) References Cited

U.S. PATENT DOCUMENTS

| | | | | |
|---|---|---|---|---|
| 8,797,828 | B1* | 8/2014 | Lev | G01V 8/00 356/486 |
| 8,953,647 | B1* | 2/2015 | Mead | H01S 3/06754 372/6 |
| 9,031,413 | B2* | 5/2015 | Doniec | H04B 13/02 398/104 |
| 9,203,524 | B2* | 12/2015 | Simpson | H04B 13/02 |
| 9,684,077 | B2* | 6/2017 | Mead | H01S 3/06754 |
| 10,183,732 | B2* | 1/2019 | Celikkol | G01C 21/20 |
| 2008/0279047 | A1 | 11/2008 | An et al. | |
| 2014/0212142 | A1* | 7/2014 | Doniec | H04B 13/02 398/104 |
| 2016/0121009 | A1* | 5/2016 | Farr | H04B 13/02 250/492.1 |
| 2016/0266247 | A1* | 9/2016 | Hjelmstad | G01S 17/102 |
| 2017/0366278 | A1* | 12/2017 | Jang | H04B 10/80 |
| 2018/0102854 | A1* | 4/2018 | Kimura | H04B 13/02 |
| 2018/0123403 | A1* | 5/2018 | Kare | G01S 17/026 |
| 2019/0141228 | A1* | 5/2019 | Oshima | H04B 10/1143 |

FOREIGN PATENT DOCUMENTS

| | | |
|---|---|---|
| CN | 103754341 | 1/2016 |
| CN | 105530055 | 4/2016 |
| CN | 106301596 | 1/2017 |
| CN | 107528634 | 12/2017 |
| KR | 1020120062587 | 6/2012 |
| KR | 101243278 | 3/2013 |
| KR | 1020150062202 | 6/2015 |
| WO | 2017086520 | 5/2017 |

OTHER PUBLICATIONS

Yoshikazu Koike et al., "Positioning and navigation for free-fall type underwater observation system," 10th International Symposium on Ultrasonic Doppler Methods for Fluid Mechanics and Fluid Engineerin, Sep. 28-30, 2016, pp. 65-68.

Rahman Zandi et al., "Underwater Sensor Network Positioning Using an AUV Moving on a Random Waypoint Path," IETE Journal of Research, Apr. 23, 2015, pp. 1-8.

Yamazato, et al., "Image Sensor Based Visible Light Communication and Its Application to Pose, Position, and Range Estimations," IEEE Communications Magazine, vol. 97-B, No. 9, Sep. 2014, pp. 1759-1765.

Hemani Kaushal et al., "Underwater Optical Wireless Communication," IEEE Access, vol. 4, 2016, pp. 1518-1547.

"Office Action of Taiwan Counterpart Application," dated Sep. 3, 2019, p. 1-p. 3.

* cited by examiner

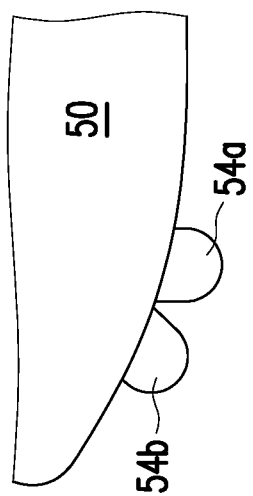
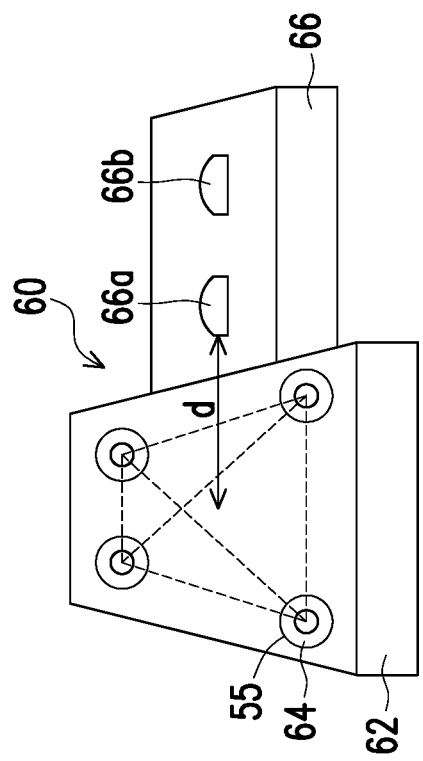
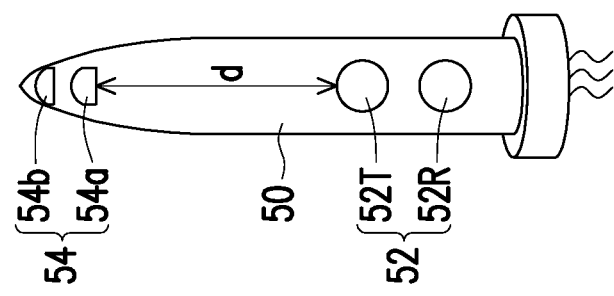
FIG. 3
FIG. 2

UNDERWATER WIRELESS COMMUNICATION APPARATUS AND COMMUNICATION METHOD THEREOF

CROSS-REFERENCE TO RELATED APPLICATION

This application claims the priority benefit of Taiwan application serial no. 107140523, filed on Nov. 15, 2018. The entirety of the above-mentioned patent application is hereby incorporated by reference herein and made a part of this specification.

BACKGROUND

Technical Field

The disclosure is directed to underwater communication apparatus, and particularly to underwater light communication apparatus, such as communication by use of visible light.

Description of Related Art

Underwater communication is a usual communication manner, which may have wide applications in the fields of military, underwater observation research, entertainment, etc.

Wireless communication is more convenient for underwater communication. For the communication in relatively short distance, in which two-way communication may use the visible light as the medium. However, since the light is travelling in straight, the transceiver devices at two locations need to be aligned, so to transmit and receive the light information from each other. In addition, when light propagates in the water, the noise induced from the ambient light should be taken into account.

How to have alignment between two underwater communication nodes and reduce the noise induced from the ambient light is an issue in underwater communication to be considered and improved.

SUMMARY

The disclosure provides an underwater communication apparatus, which is movable in the water environment, and may communicate with a node communication apparatus set at an underwater node. An alignment mechanism has been set between the underwater communication apparatus and the node communication apparatus, with capability to effectively align and then improve the communication performance.

In an exemplary embodiment, the disclosure provides an underwater communication apparatus, movable in a water environment to communicate with a node communication apparatus set at an underwater node. The underwater communication apparatus comprises a light transmitting device, a light receiving device, a light identification device, a power apparatus, and a control/monitor apparatus. The light transmitting device transmits a first communication light. The light receiving device receives a second communication light. The light identification device is to detect a reference pattern in two dimensions set on the node communication apparatus and thereby obtain a detection pattern. The light transmitting device and the light receiving device respectively corresponding to the light identification device are set at two relative locations. The power apparatus drives the underwater communication apparatus. The control/monitor apparatus obtains the detection pattern from the light identification device and analyzes a difference state between the reference pattern and the detection pattern, and controls the power apparatus according to the difference state to move the underwater communication apparatus to a location for the detection pattern and the reference pattern being two dimensionally aligned.

In an exemplary embodiment, the disclosure further provides an underwater communication method, used to communicate with a node communication apparatus set at an underwater node. The underwater communication method comprises providing an underwater communication apparatus; driving the underwater communication apparatus to move in a water environment, so to relatively align to the node communication apparatus; and performing a communication between the underwater communication apparatus and the node communication apparatus. The underwater communication apparatus is implemented to comprise a light transmitting device, a light receiving device, a light identification device, a power apparatus, and a control/monitor apparatus. The light transmitting device transmits a first communication light. The light receiving device receives a second communication light. The light identification device is to detect a reference pattern in two dimensions set on the node communication apparatus and thereby obtain a detection pattern. The light transmitting device and the light receiving device respectively corresponding to the light identification device are set at two relative locations. The power apparatus drives the underwater communication apparatus. The control/monitor apparatus obtains the detection pattern from the light identification device and analyzes a difference state between the reference pattern and the detection pattern, and controls the power apparatus according to the difference state to move the underwater communication apparatus to a location for the detection pattern and the reference pattern being two dimensionally aligned.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 2 is a drawing, schematically illustrating the alignment mechanism for the underwater communication apparatus, according to an exemplary embodiment of the disclosure.

FIG. 3 is a drawing, schematically illustrating the structure of the light identification device of the underwater communication apparatus, according to an exemplary embodiment of the disclosure.

DESCRIPTION OF THE EMBODIMENTS

The disclosure provides a underwater communication technology using light as the communication medium, in which a two-dimensional alignment may be at least achieved between the underwater communication apparatus movable in water and the node communication apparatus constantly set at the water node. The two-dimensional alignment comprises the location alignment at the plane and the orientation alignment.

Further considering to the interference from the ambient light, different wavelengths for the communication light are taken. The wavelength taken for the communication light transmitted from the underwater communication apparatus movable in water can be the wavelength distinguishable from the ambient light, such as in a range of green light. The wavelength taken for the communication light transmitted from the node communication apparatus constantly set at the water node can be the wavelength with better efficiency, such as in a range of blue light.

Several exemplary embodiments are provided for describing the disclosure, but the disclosure is not limited to the exemplary embodiments as provided.

Figure 1:
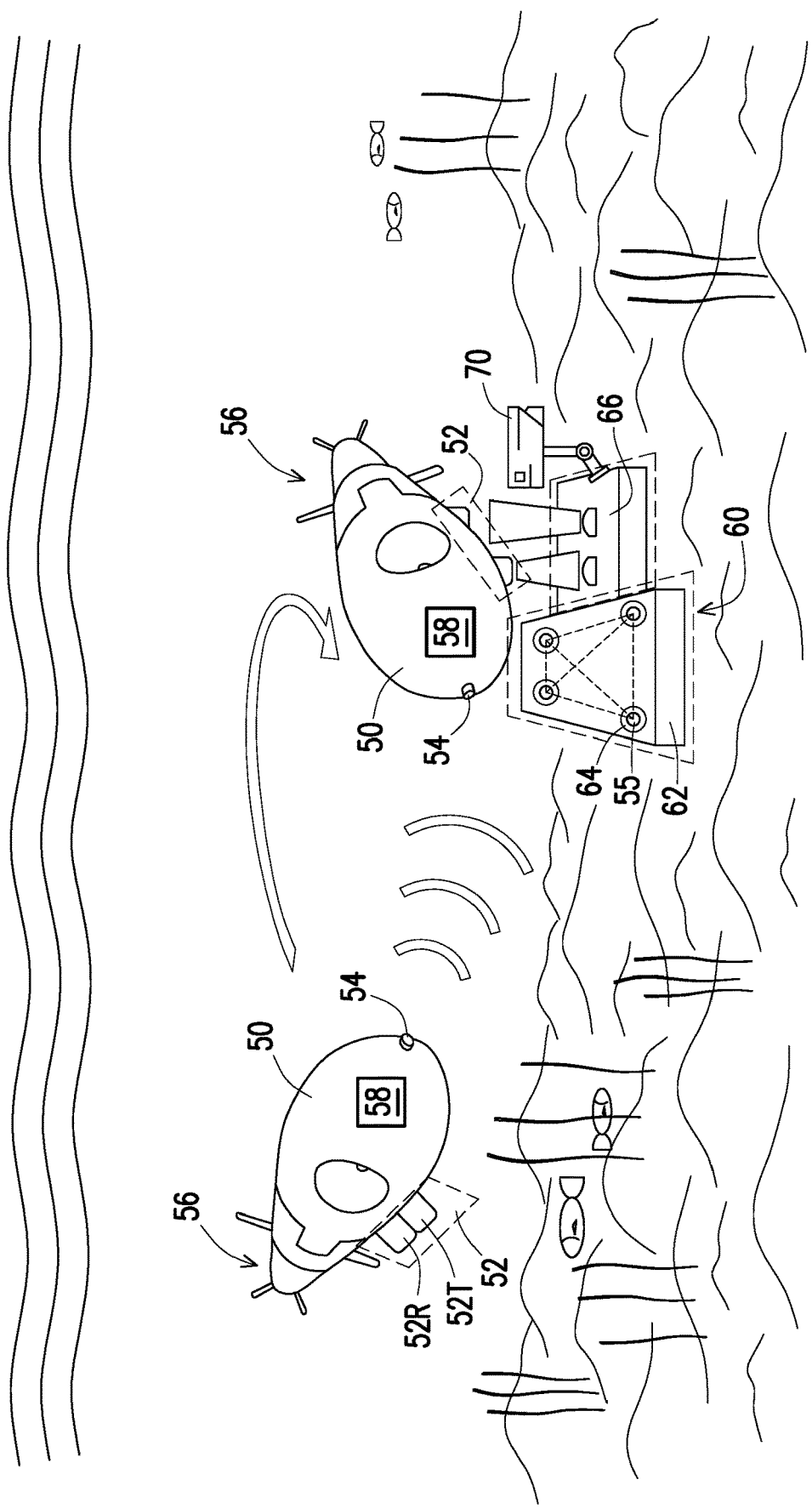
FIG. 1 is a drawing, schematically illustrating a structure of an underwater communication apparatus, according to an exemplary embodiment of the disclosure.

FIG. 1 is a drawing, schematically illustrating a structure of an underwater communication apparatus, according to an exemplary embodiment of the disclosure. Referring to FIG. 1, the field of entertainment in observing the underwater activities is taken as an example for the application of underwater communication. For example, the aquarium may provide instant dynamic images of underwater scenery. The disclosure is not just limited the applications.

The underwater communication apparatus 50 in an example is a vehicle that can be moved in water, in which the power is adapted to move in displacement and rotation.

The underwater communication apparatus 50 in operation is to communicate with the node communication apparatus 60 constantly set at a water node. To effectively have the light communication, the underwater communication apparatus 50 need to be aligned to the node communication apparatus 60, so to improve the efficiency to transmitting and receiving the light signals.

As a whole structure, the underwater communication apparatus 50 comprises a light transmitting device 52T, a light receiving device 52R, a light identification device 54, a power apparatus 56, and a control/monitor apparatus 58. The light transmitting device 52T and the light receiving device 52R form a light communication unit 52. The light transmitting device 52T transmits a first communication light. The light receiving device 52R receives a second communication light. The wavelength range of the first communication light as transmitted by the light transmitting device 52T is different from the wavelength range of the second communication light as received by the light receiving device 52R. In general, the attenuation rate of the wavelength range of blue light in water is relatively small. The secondary one is the wavelength range of green light. In an exemplary embodiment, the first communication light may take the wavelength range of green light and the second communication light may take the wavelength range of blue light. The first communication light taking the wavelength range of green light may reduce the interference from the ambient light. However, the first communication light and the second communication light may be taken according to the actual need, being the same or different.

The light identification device 54 is used to detect the reference pattern 64 in two dimensions, which is set on a light pattern panel 62 of the node communication apparatus 60, so to obtain a detection pattern 55. In an exemplary embodiment, the reference pattern 64 is formed from four light spots as a right angle quadrilateral indicated by dash line. The right angle quadrilateral as viewed by the light identification device 54 by a slant direction, the detection pattern 55 is deformed. In addition, as considering the location as set, the light transmitting device 52T and the light receiving device 52R are respectively and constantly set at the locations with respect to the light identification device 54. The mechanism is to be described in better detail later.

The power apparatus 56 is used to drive the underwater communication apparatus 50 to have the effect of displacement and rotation. The control/monitor apparatus 58 obtains the detection pattern 55 from the light identification device 54, such as the image shooting from the reference pattern 64. The control/monitor apparatus 58 analyzes a different state between the detection pattern 55 and the reference pattern 64 on the light pattern panel 62 in right angle quadrilateral. According to the different state as analyzed such as a pattern with geometrical deformation, the moving direction can be determined, so that the power apparatus 56 drives the underwater communication apparatus to move and then to reach aligned location between the detection pattern 55 and the reference pattern 64. In an example, the location is the center point or the centroid of the reference pattern 64.

The node communication apparatus 60 corresponding to the light communication unit 52 is also set with a node light communication unit 66, to have bi-directional communication with the light transmitting device 52T and the light receiving device 52R. The content in communication is the underwater scenery taken by the underwater camera 70 of the node communication apparatus 60. The instruction et al. to the underwater camera 70 can be sent by the mechanism of bi-directional communication. That is, the user can operate the underwater camera 70 through the bi-directional communication between the underwater communication apparatus 50 and the node communication apparatus 60, so to have the application as intended.

The aligning mechanism between underwater communication apparatus 50 and the node communication apparatus 60 is described in detail as follows. FIG. 2 is a drawing, schematically illustrating the alignment mechanism for the underwater communication apparatus, according to an exemplary embodiment of the disclosure. Referring to FIG. 2, the underwater communication apparatus in an example may be a movable vehicle in water, which is implemented with various device as described above. In operation, the light communication unit 52 of the underwater communication apparatus 50 needs to be aligned to the node light communication unit 66 of the node communication apparatus 60, so to effectively transmit and receive light. The node light communication unit 66 is implemented with a node light receiving device 66a to receive the first communication light, and a node light transmitting device 66b to transmit the second communication light. The node light communication unit 66 is at a constant location with respect to the light pattern panel 62, such as a distance d, which is consistent with the relation between the light communication unit 52 and the light identification device 54 of the underwater communication apparatus 50. When the detection pattern 55 of the light identification device 54 is aligned to the reference pattern 64, the node light communication unit 66 is then aligned to the light communication unit 52.

FIG. 3 is a drawing, schematically illustrating the structure of the light identification device of the underwater communication apparatus, according to an exemplary embodiment of the disclosure. Referring to FIG. 3, the underwater communication apparatus 50 is movable on the water surface or under the water, not at a fixed location. When the underwater communication apparatus 50 is to communicate with the node communication apparatus 60, it needs to align to each other. In general situation, the light identification device 54 of the underwater communication apparatus 50 is looking for the reference pattern 64. In an exemplary embodiment, the light identification device 54 comprises a first imaging device 54a and a second imaging device 54b.

As to the mechanism using two imaging devices, the first imaging device 54a is to obtain the first pattern by taking image at right down direction from the underwater communication apparatus 50 via shooting the reference pattern 64. The first pattern is used to assure the alignment is done. The second imaging device 54b is to obtain the second pattern by taking image at a slant direction with respect to the right down direction. This is useful for primarily looking for the reference pattern 64. After the reference pattern 64 has been taken, the second pattern is produced. The slant direction in an example may be 45 degrees. In a further example, it shoots image at a front slant direction by 45 degrees. The image shooting at the slant direction can observer the reference pattern 64 at far distance. The control of moving direction for the underwater communication apparatus 50 can be quickly down. The reference pattern 64 in the exemplary embodiment is a right angle quadrilateral as an example. However, depending on capability for analyzing the geometric shape, the reference pattern 64 can be polygon, such as triangle or other polygons. A regular polygon is helpful for analyzing. Taking the right angle quadrilateral as an example, as imaged by the second imaging device 54b, the reference pattern 64 as observed would be deformed. The moving direction can be analyzed out according to the deformed pattern.

Figure 4:
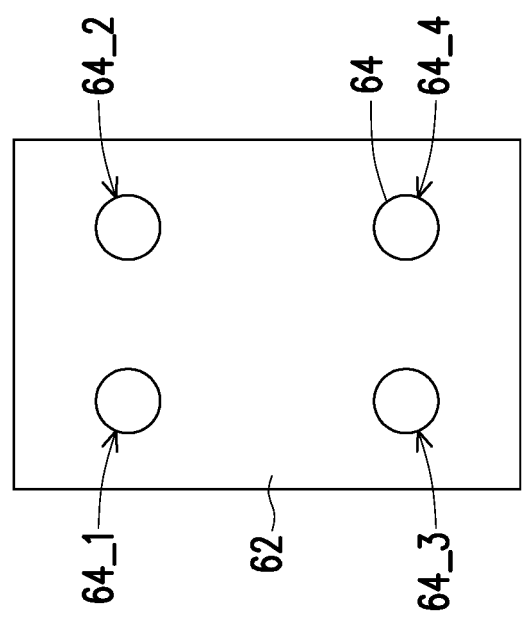
FIG. 4 is a drawing, schematically illustrating a reference pattern, according to an exemplary embodiment of the disclosure.

FIG. 4 is a drawing, schematically illustrating a reference pattern, according to an exemplary embodiment of the disclosure. Referring to FIG. 4, the reference pattern 64 on the light pattern panel 62 is a right angle quadrilateral, formed from four light spots 64_1, 64_2, 64-_3, 64_4, in which the alignment reference point is the center point as an example. The light identification mechanism for the light spots would be described later. The light spots can be distinct to each other, so to determine a direction.

Figure 5:
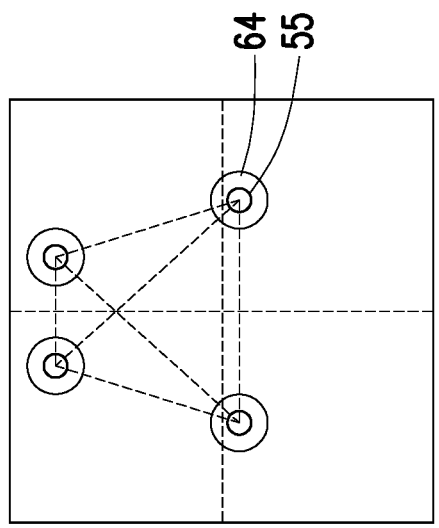
FIG. 5 is a drawing, schematically illustrating a detection pattern, according to an exemplary embodiment of the disclosure.

FIG. 5 is a drawing, schematically illustrating a detection pattern, according to an exemplary embodiment of the disclosure. Referring to FIG. 5, the reference pattern 64 is observed by the second imaging device 54b as the second pattern, which is deformed according to the optical viewing angle. Thus, the light spots 64_1, 64_2, 64_3, 64_4 observed as a detection pattern 55 is a trapezoid in an example. According to the analysis on the trapezoid with respect to the reference pattern 64 of right angle quadrilateral, it can be judged that the location is at the front side, and the underwater communication apparatus 50 in this example needs to be moved forward, so to approach to the reference pattern 64. In the meantime, the first imaging device 54a is still not able to produce the first pattern yet. The first stage of movement for the underwater communication apparatus 50 in an example is judged based on the deformation of the second pattern as observed by the second imaging device 54b.

In an exemplary embodiment, the analysis on the pattern deformation and the control of moving direction is judged by the control/monitor apparatus 58 according to the shape of the second pattern at the instant time point, so to determine the movement of the underwater communication apparatus 50, and then the first pattern can thereby be effectively produced. As to be described later, the analysis between the first pattern and the reference pattern may comprises the control for location alignment and the rotation alignment.

Figure 6:
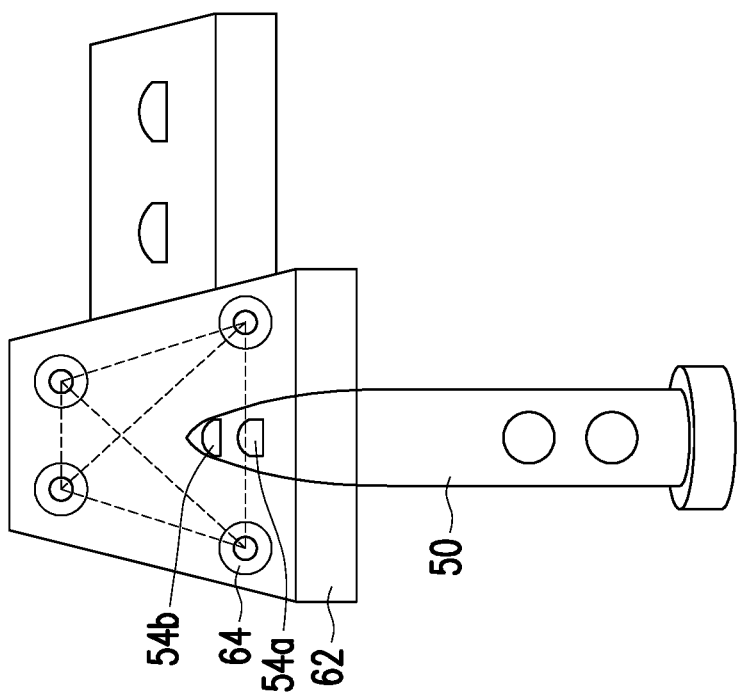
FIG. 6 is a drawing, schematically illustrating the movement of the underwater communication apparatus for alignment, according to an exemplary embodiment of the disclosure.

FIG. 6 is a drawing, schematically illustrating the movement of the underwater communication apparatus for alignment, according to an exemplary embodiment of the disclosure. Referring to FIG. 6, when the underwater communication apparatus 50 is in right front of the reference pattern 64, the detection pattern as observed by detection is a trapezoid indicated by dash line with an upward direction. The underwater communication apparatus 50 is driven to move forward.

Figure 7:
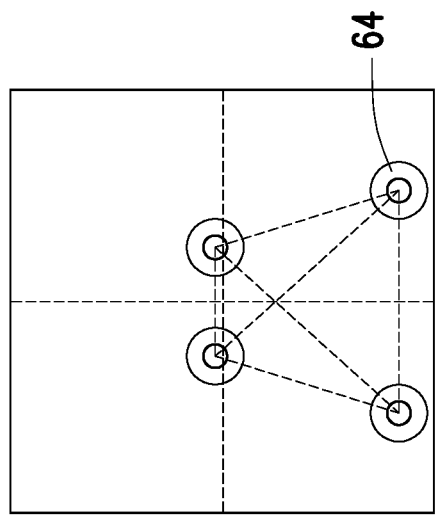
FIG. 7 is a drawing, schematically illustrating about analyzing the detection pattern, according to an exemplary embodiment of the disclosure.

FIG. 7 is a drawing, schematically illustrating about analyzing the detection pattern, according to an exemplary embodiment of the disclosure. Referring to FIG. 7, when underwater communication apparatus 50 is moved forward, the trapezoid pattern is changing but the trapezoid shape remains and the location is shifted downward. This implies that the underwater communication apparatus 50 is more approaching to or even over the location to be aligned. The underwater communication apparatus 50 may stop first. The first imaging device 54a is then able to take image to have the first pattern. It would be rather similar to the reference pattern 64.

Figure 8:
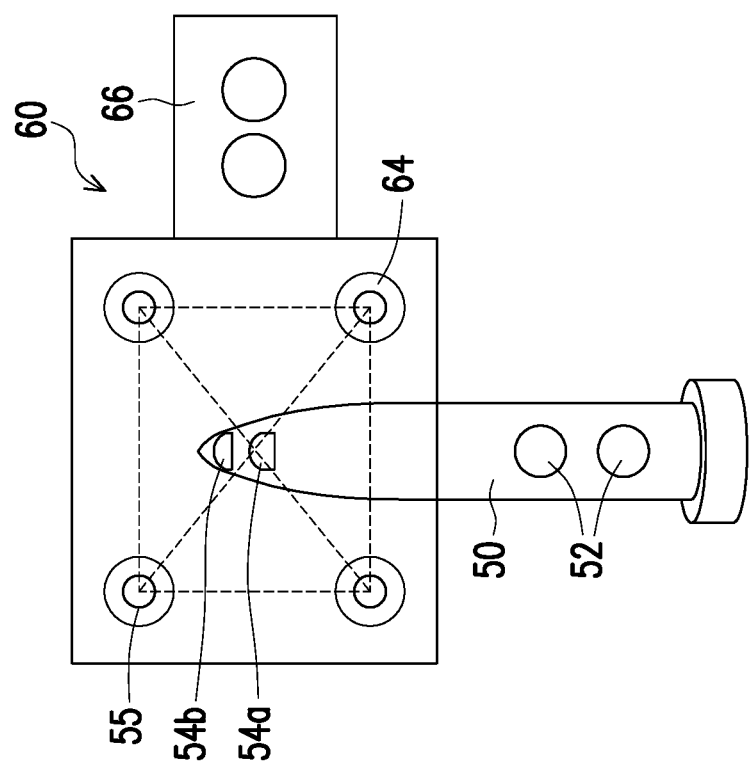
FIG. 8 is a drawing, schematically illustrating the movement of the underwater communication apparatus for alignment, according to an exemplary embodiment of the disclosure.

FIG. 8 is a drawing, schematically illustrating the movement of the underwater communication apparatus for alignment, according to an exemplary embodiment of the disclosure. Referring to FOG. 8, the analysis on the detection pattern 55 at the meantime is changed to the first pattern as obtained by the first imaging device 54a. The underwater communication apparatus 50 is driven to have slight movement, by an attempt to let the first imaging device 54a is a right down aligned to the reference point such as the center point of the reference pattern 64.

Figure 9:
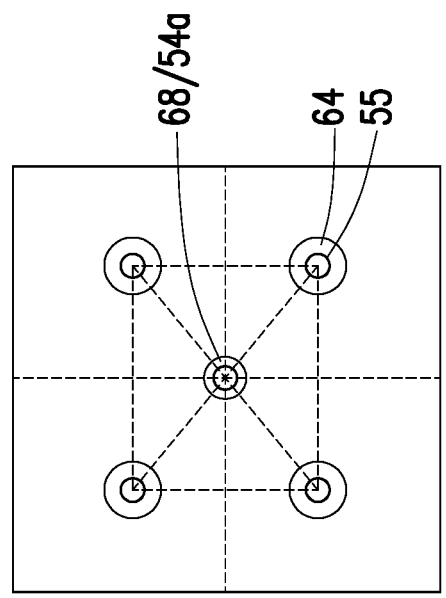
FIG. 9 is a drawing, schematically illustrating the detection pattern after movement for alignment, according to an exemplary embodiment of the disclosure.

FIG. 9 is a drawing, schematically illustrating the detection pattern after movement for alignment, according to an exemplary embodiment of the disclosure. Referring to FIG. 9, when the underwater communication apparatus 50 is moved to the aligned point, the reference point of reference pattern 64, that is, the center point 68 is aligned to the first imaging device 54a at the right down direction. In other words, for an exemplary embodiment, the detection pattern 55 corresponding to the reference point would be located on the center point of the image screen. In an exemplary embodiment, if the orient direction of the underwater communication apparatus 50 is also matched to the orient direction of the underwater communication apparatus 60, the detection pattern 55 is similarly matched to the reference pattern 64. If the orient direction of the underwater communication apparatus 50 is not matched to the orient direction of the underwater communication apparatus 60, the subsequent rotation adjustment is needed.

Figure 10:
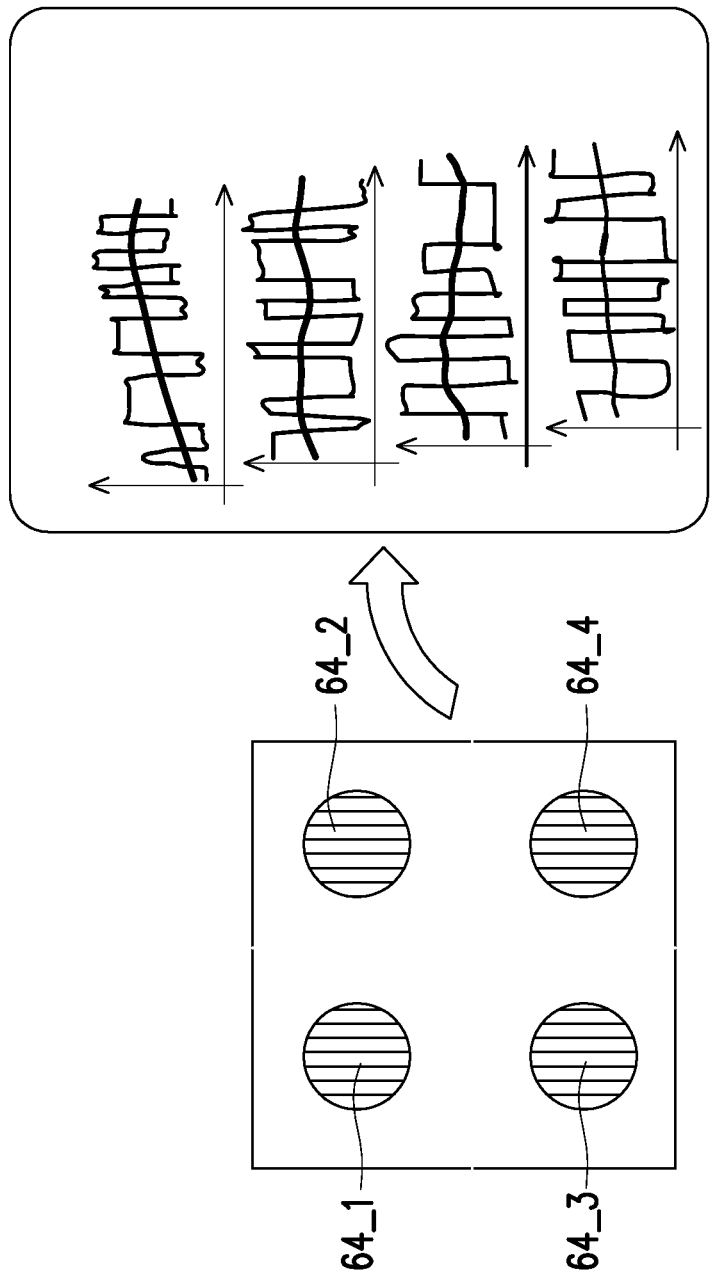
FIG. 10 is a drawing, schematically illustrating the identification mechanism for the light spots, according to an exemplary embodiment of the disclosure.

FIG. 10 is a drawing, schematically illustrating the identification mechanism for the light spots, according to an exemplary embodiment of the disclosure. Referring to FIG. 10, to determine the direction of the reference pattern 64, the light spots 64_1, 64_2, 64_3, 64_4 need to be identified, so to determine the orient direction for reference. In an exemplary direction, each light spot transmits a beacon for itself, such as the different pulse waveform. The light identification device 54 can identify each light spot, so to determine the orient direction according to the preset sequence for the light spots.

Figure 11:
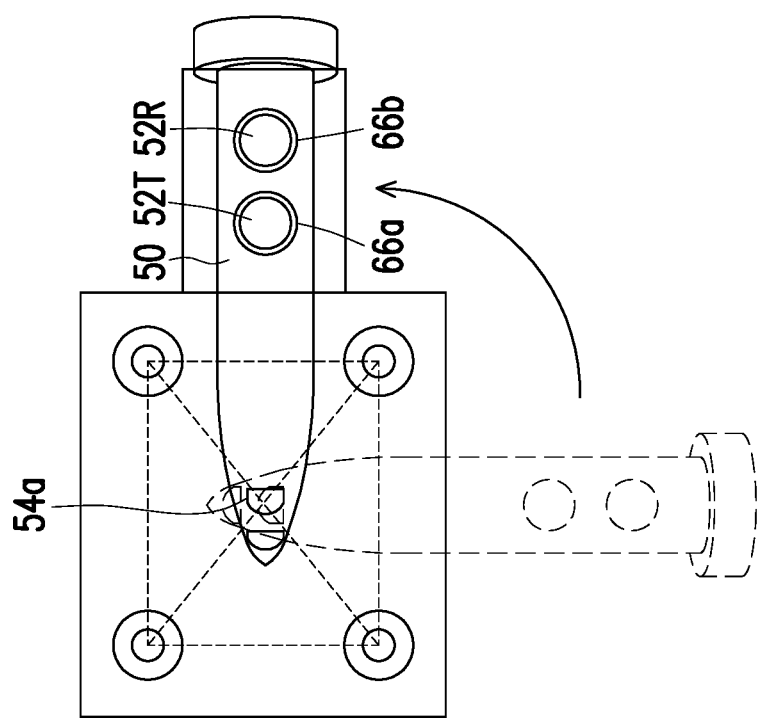
FIG. 11 is a drawing, schematically illustrating rotation mechanism, according to an exemplary embodiment of the disclosure.

FIG. 11 is a drawing, schematically illustrating rotation mechanism, according to an exemplary embodiment of the disclosure. Referring to FIG. 11, when the underwater communication apparatus 50 uses the first imaging device 54a to have the location alignment, it takes the reference point as the rotation axis to perform the orientation alignment. The effect of the orientation alignment is to allow the light transmitting device 52T and the light receiving device 52R to be relatively aligned to the node light receiving device 66a and the node light transmitting device 66b, to perform light communication in straight line. The rotation mechanism is following. The underwater communication apparatus 50 in an example is taking the reference point as the rotating axis for performing rotation. When the setting sequence of the distinguishable light spots of the detection pattern 55 as shown in FIG. 10 is consistent with the preset sequence in the reference pattern 64, it indicates that the directions of the underwater communication apparatus 50 and the node communication apparatus 60 are aligned, resulting in completion of alignment, correctly. As shown in FIG. 2, when the underwater communication apparatus 50 and the node communication apparatus 60 are aligned, due to the relative location being constant, the light transmitting device 52T and the light receiving device 52R can respectively aligned to the node light receiving device 66a and the node light transmitting device 66b. The light communication can be normally performed.

The additional adjustment is the depth adjustment for the underwater communication apparatus 50. Since the light signal would attenuate with distance in water, according to the actual need, the depth of the underwater communication apparatus 50 may be further adjusted. However, the depth adjustment may be in a proper range.

Figure 12:
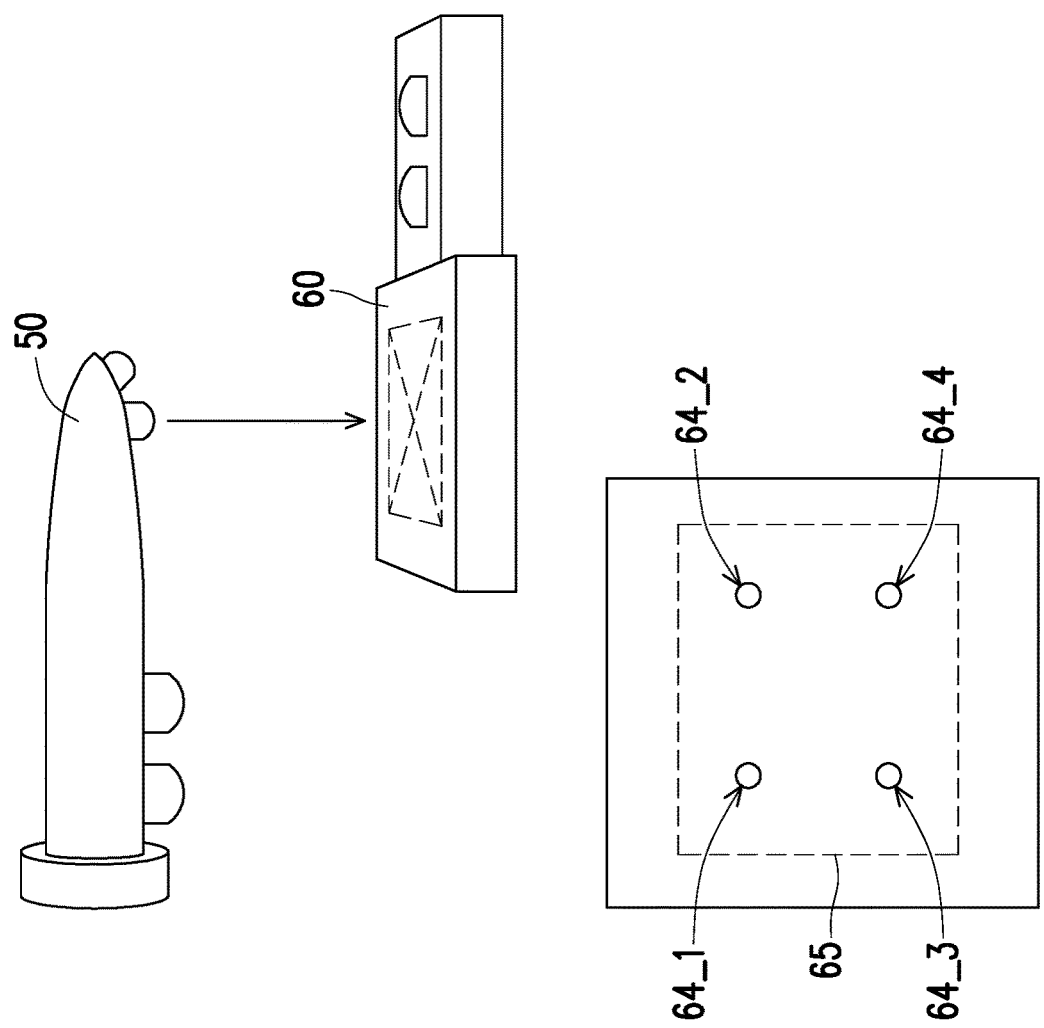
FIG. 12 is a drawing, schematically illustrating a relation between depth of the underwater communication apparatus and the detection pattern, according to an exemplary embodiment of the disclosure.

FIG. 12 is a drawing, schematically illustrating a relation between depth of the underwater communication apparatus and the detection pattern, according to an exemplary embodiment of the disclosure. Referring to FIG. 12, the distribution of the locations of the light spots 64_1, 64_2, 64_3, 64_4 as detected are within an imaging range 65 but changing with the depth of the underwater communication apparatus 50. The minimum depth of the underwater communication apparatus 50. Is approaching to zero, that is, the underwater communication apparatus 50 is floating on the water surface. In general, the distance between the node communication apparatus 60 and the underwater communication apparatus 50 is larger, then distance between the light spots is shorter. Generally, it is acceptable that the light spots 64_1, 64_2, 64_3, 64_4 can be discerned under the resolution condition, in which the alignment mechanism can still be performed.

Figure 13:
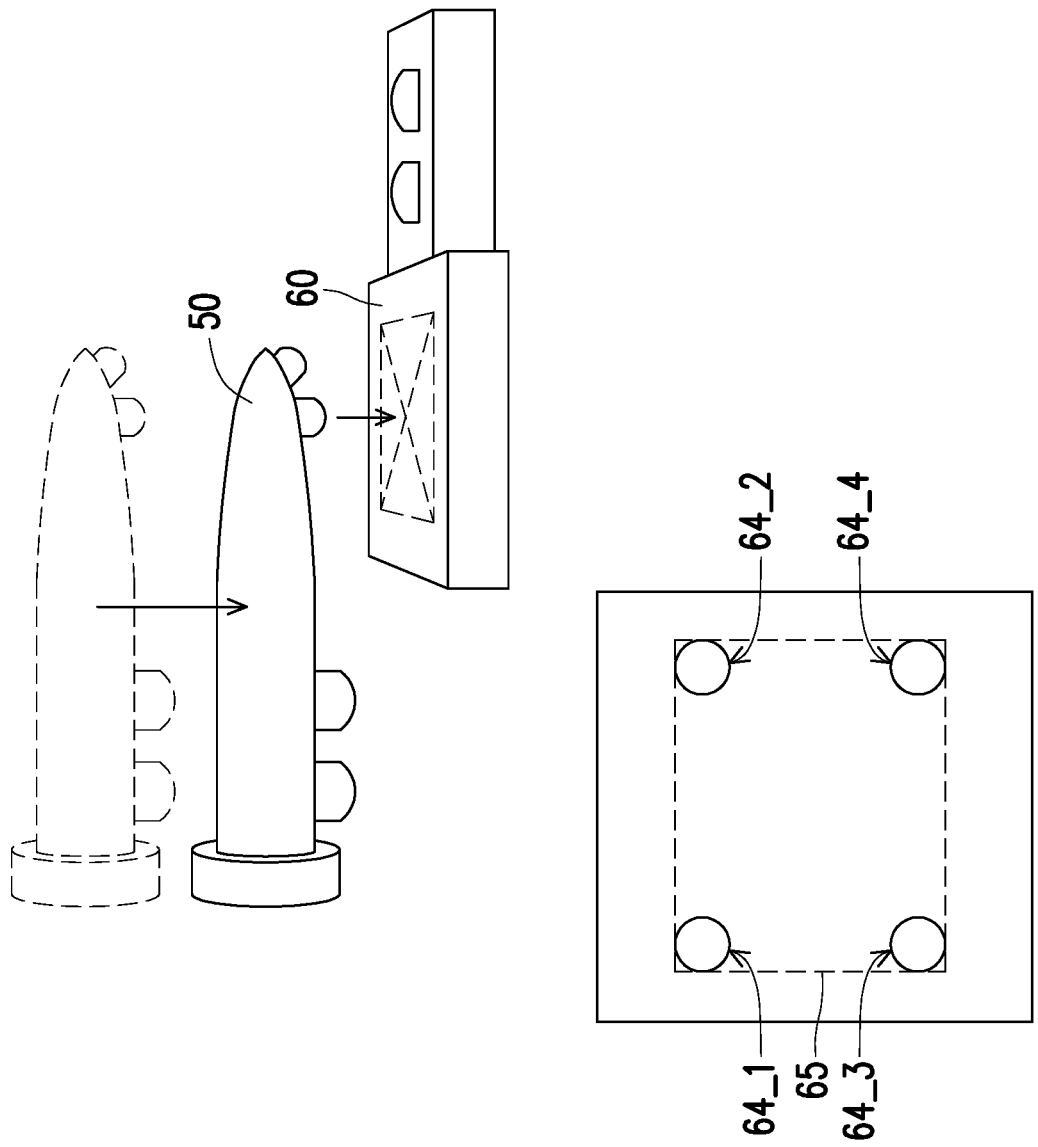
FIG. 13 is a drawing, schematically illustrating a relation between depth of the underwater communication apparatus and the detection pattern, according to an exemplary embodiment of the disclosure.

FIG. 13 is a drawing, schematically illustrating a relation between depth of the underwater communication apparatus and the detection pattern, according to an exemplary embodiment of the disclosure. Referring to FIG. 13, on contrary to FIG. 12, if the distance between the node communication apparatus 60 and the underwater communication apparatus 50 is smaller, then distance between the light spots is longer. Generally, it is acceptable that the light spots 64_1, 64_2, 64_3, 64_4 as detected are not over the imaging range 65.

Figure 14:
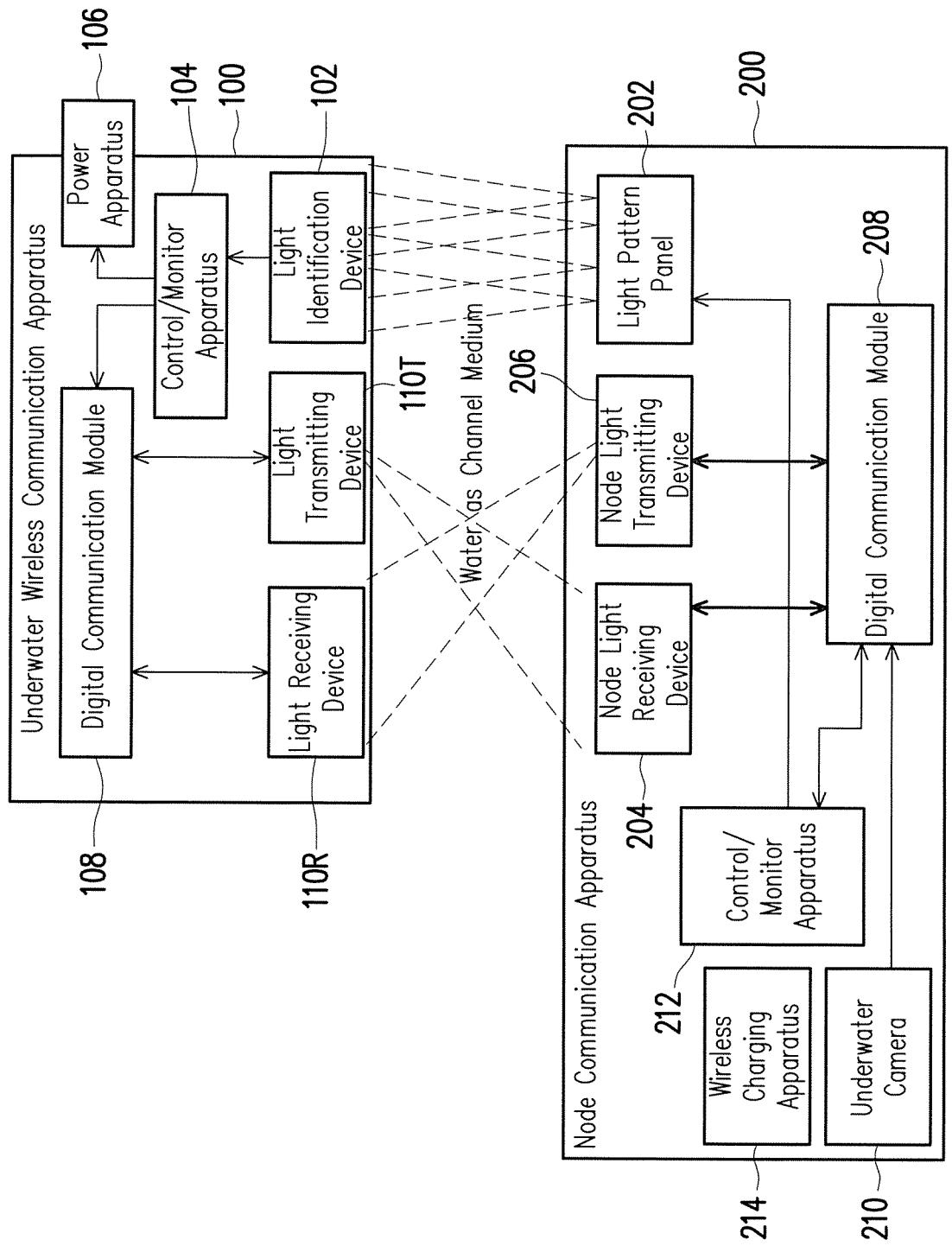
FIG. 14 is a drawing, schematically illustrating a communication system of the underwater communication apparatus, according to an exemplary embodiment of the disclosure.

FIG. 14 a drawing, schematically illustrating a communication system of the underwater communication apparatus, according to an exemplary embodiment of the disclosure. Referring to FIG. 14, as to the electronic equipment of the communication system, as described above, in an exemplary embodiment, the underwater communication apparatus 100 is movable in the water environment, used to communicate with the node communication apparatus 200 set at a water node. The underwater communication apparatus 100 comprises a light transmitting device 110T to transmit the first communication light and a light receiving device 110R receives the second communication light. The communication channel medium of the underwater communication is water. The light identification device 102 is used to detect a reference pattern in two dimensions, which is set on in the node communication apparatus 200, so to obtain a detection pattern. The light transmitting device 110T and the light receiving device 110R are respectively and constantly set at the locations with respect to the light identification device 102. The power apparatus 106 drives the underwater communication apparatus 100 to produce displacement and rotation. The control/monitor apparatus 104 obtains the detection pattern from the light identification device 102 and analyzes a difference state between the detection pattern 55 and the reference pattern 64. It controls the power apparatus 106 according to the difference state to move the underwater communication apparatus 100 to a location for the detection pattern and the reference pattern being two dimensionally aligned.

The underwater communication apparatus 100 further comprises the digital communication module 108, so to provide the necessary communication between the internal various devices of the underwater communication apparatus 100. The digital communication module 108 may also operated with the light transmitting device 110T, the light receiving device 110R for the user at far end to operate the node communication apparatus 200.

The light identification device 102 comprises a first imaging device and a second imaging device. The first imaging device images along a right down direction from the underwater communication apparatus 100 to obtain a first pattern, so to assure the alignment. The second imaging device imaging at a slant direction from the right down direction to produce a second pattern for looking for the reference pattern. The control/monitor apparatus 104 according to the shape of the second pattern at the instant time point, so to determine the movement of the underwater communication apparatus 100 for approaching to the node communication apparatus 200, and then the first pattern can thereby be effectively produced. The location alignment and the orientation alignment are involved between the underwater communication apparatus 100 and the node communication apparatus 200.

The equipment of the node communication apparatus 200 comprises a node light receiving device 204 to receive the first communication light. A node light transmitting device 206 transmits the second communication light. A light pattern panel 202 produce a plurality of light spots to form a reference pattern. The two relative locations for the light transmitting device 110T and the light receiving device 110R of the underwater communication apparatus 100 are accordingly set with respect to the set for the node light receiving device 204 and the node light transmitting device 206 in the node communication apparatus 200, in which the relative locations between them are consistent. When the underwater communication apparatus 100 is positioned, the light transmitting device 110T and the light receiving device 110R are respectively aligned to the node light receiving device 204 and the node light transmitting device 206.

The node communication apparatus 200 further comprises an underwater camera 210, to serve as monitoring apparatus, to obtain shooting images of the underwater scenery. In addition, it comprises control/monitor apparatus 212 to perform a general control on the node communication apparatus 200, so to communicate with the underwater communication apparatus 100. A digital communication module 208 connects with the node light receiving device 204, the node light transmitting device 206, the underwater camera 210 and is controlled by the control/monitor apparatus 212, so to communicate with a far-end user through the underwater communication apparatus 100.

Since the node communication apparatus 200 can be set at a water node, such as a platform of the bottom in water environment. The power can be provided by the battery unit. In this situation, the node communication apparatus 200 is also implemented with a wireless charging apparatus 214 to charge the battery unit.

Generally, the underwater communication apparatus and the underwater communication method of the disclosure, by the use of detecting the reference pattern, analyzing a difference state between the detection pattern and the reference pattern, can effectively displace and rotate the underwater communication apparatus, so to have the alignment. The different wavelength ranges for the bi-directional light communication are used to reduce the noise.

As to the description above, the disclosure as a whole with the drawings may have the features as follows.

In an exemplary embodiment, as shown in FIG. 1, an underwater communication apparatus 50 is movable in a water environment to communicate with a node communication apparatus 60 set at an underwater node. The underwater communication apparatus 50 comprises a light transmitting device 52T, a light receiving device 52R, a light identification device 54, a power apparatus 56, and a control/monitor apparatus 58. The light transmitting device 52T transmits a first communication light. The light receiving device 52R receives a second communication light. The light identification device 54 is to detect a reference pattern 64 in two dimensions set on the node communication apparatus 60 and thereby obtain a detection pattern 55. The light transmitting device 52T and the light receiving device 52R respectively corresponding to the light identification device 54 are constantly set at two relative locations. The power apparatus 56 drives the underwater communication apparatus 50. The control/monitor apparatus 58 obtains the detection pattern 55 from the light identification device 54 and analyzes a difference state between the reference pattern 64 and the detection pattern 55, and controls the power apparatus 56 according to the difference state to move the underwater communication apparatus 50 to a location for the detection pattern 55 and the reference pattern 64 being two dimensionally aligned.

In an exemplary embodiment, as to the underwater communication apparatus 50 shown in FIG. 9, the location for the detection pattern 55 and the reference pattern 64 being two dimensionally aligned comprises a location alignment to a reference point (center point 68) and an orientation alignment with respect to the reference point as shown in FIG. 11.

In an exemplary embodiment, as to the underwater communication apparatus 50, the detection pattern 55 comprises a first pattern and a second pattern. The light identification device 54 comprises: a first imaging device 54a to obtain the first pattern by taking image at right down direction from the underwater communication apparatus 50; and a second imaging device 54b to obtain the second pattern by taking image at a slant direction with respect to the right down direction, used to look for the reference pattern 64. The control/monitor apparatus 58 determines a movement of the underwater communication apparatus 50 according to a shape of the second pattern at an instant time point, so to have the first pattern being effectively produced. As a relation between FIG. 8 and FIG. 11, the location alignment after movement and the orientation alignment after rotation are involved between the first pattern and the reference pattern.

In an exemplary embodiment, as to the underwater communication apparatus 50, the slant direction for the second imaging device 54b is in a range of 0 to 90 degrees.

In an exemplary embodiment, as to the underwater communication apparatus 50, the node communication apparatus 60 comprises: a node light receiving device to receive the first communication light; a node light transmitting device to transmit the second communication light; and a light pattern panel having light emitting devices such as a plurality of light spots 64_1, 64_2, 64_3, 64_4 to produce the reference pattern 64. The relative locations of the light transmitting device 52T and the light receiving device 52R with respect to the light identification device 54 have been preset. Two relative locations of the node light receiving device 66a and the node light transmitting device 66b with respect to the reference pattern 64 have also been preset in consistent with the previous relative locations. As such, the light transmitting device 52T and the light receiving device 52R are respectively aligned to the node light receiving device 66a and the node light transmitting device 66b. That is as described above, the light transmitting device 52T and the light receiving device 52R respectively are constantly set at the two relative locations with respect to the light identification device and are consistent with two relative locations of the node light receiving device 66a and the node light transmitting device 66b with respect to the reference pattern 64.

In an exemplary embodiment, as to the underwater communication apparatus 50, the reference pattern 64 comprises at least three light spots being distinct to one another, to form a polygon pattern.

In an exemplary embodiment, as to the underwater communication apparatus 50, the polygon pattern has a geometric reference point, wherein the at least three light spots determine an orientation angle being relating to rotation.

In an exemplary embodiment, as to the underwater communication apparatus 50, the geometric reference point is a center point 68 or the center point 68 is similar to a centroid of the polygon pattern at a specific geometric location.

In an exemplary embodiment, as to the underwater communication apparatus 50, the polygon pattern is a right angle quadrilateral, taking a center point 68 of the right angle quadrilateral as the geometric reference point.

In an exemplary embodiment, as to the underwater communication apparatus 50, the power apparatus 56 drives the underwater communication apparatus 50, so that a detected reference point of the detection pattern 55 is aligned to the geometric reference point through movement, and the detection pattern 55 and the reference pattern 64 are in similar shape. Further due to rotation by the power apparatus 56, the detection pattern 55 is consistent with the orientation angle of the reference pattern 64.

In an exemplary embodiment, as to the underwater communication apparatus 50, when the detection pattern 55 and the reference pattern 64 are similar in shape, as shown in FIG. 12 and FIG. 13, a depth of the underwater communication apparatus 50 is adjusted according to an area of the detection pattern 55.

In an exemplary embodiment, as to the underwater communication apparatus 50, a range of the depth between a first depth having a resolution for allowing the at least three light spots to be distinct and a second depth for the at least three light spots not crossing an image boundary in taking image during detection.

In an exemplary embodiment, as to the underwater communication apparatus 50, each of the at least three light spots, as shown in FIG. 10, respectively transmits a distinct pulse beacon, so to identify the at least three light spots.

In an exemplary embodiment, as to the underwater communication apparatus 50, the node communication apparatus 60 further comprises a monitor apparatus such as the underwater camera 70, the monitor apparatus communicates with the underwater communication apparatus 50 through the node light receiving device 66a and the node transmitting device 66b.

In an exemplary embodiment, as to the underwater communication apparatus 50, wavelengths for the first communication light and the second communication light are different.

In an exemplary embodiment, as to the underwater communication apparatus 50, the first communication light is green light and the second communication light is blue light.

In an exemplary embodiment, the disclosure further provides an underwater communication method, used to communicate with a node communication apparatus 60 set at an underwater node. The underwater communication method comprises providing an underwater communication apparatus 50; driving the underwater communication apparatus 50 to move in a water environment (movement shown in FIG. 1), so to relatively align to the node communication apparatus 60; and performing a communication between the underwater communication apparatus 50 and the node communication apparatus 60. The underwater communication apparatus 50 is implemented to comprise a light transmitting device 52T, a light receiving device 52R, a light identification device 54, a power apparatus 56, and a control/monitor apparatus 58. The light transmitting device 52T transmits a first communication light. The light receiving device 52R receives a second communication light. The light identification device 54 is to detect a reference pattern 64 in two dimensions set on the node communication apparatus and thereby obtain a detection pattern 55. The light transmitting device 52T and the light receiving device 52R respectively corresponding to the light identification device 54 are constantly set at two relative locations. The power apparatus 56 drives the underwater communication apparatus 50. The control/monitor apparatus 58 obtains the detection pattern 55 from the light identification device 54 and analyzes a difference state between the reference pattern 64 and the detection pattern 55, and controls the power apparatus 56 according to the difference state to move the underwater communication apparatus 50 to a location for the detection pattern 55 and the reference pattern 64 being two dimensionally aligned.

In an exemplary embodiment, as to the underwater communication method, the location for the detection pattern 55 and the reference pattern 64 being two dimensionally aligned comprises a location alignment to a reference point and an orientation alignment with respect to the reference point.

In an exemplary embodiment, as to the underwater communication method, the detection pattern 55 comprises a first pattern and a second pattern. The light identification device 54 comprises: a first imaging device 54a to obtain the first pattern by taking image at right down direction from the underwater communication apparatus 50; and a second imaging device 54b to obtain the second pattern by taking image at a slant direction with respect to the right down direction, used to look for the reference pattern 64. The control/monitor apparatus 58 determines a movement of the underwater communication apparatus 50 according to a shape of the second pattern at an instant time point, so to have the first pattern being effectively produced. The location alignment after movement and the orientation alignment after rotation are involved between the first pattern and the reference pattern.

In an exemplary embodiment, as to the underwater communication method, the slant direction for the second imaging device 54b of the underwater communication apparatus 50 is in a range of 0 to 90 degrees.

In an exemplary embodiment, as to the underwater communication method, the node communication apparatus 60 comprises: a node light receiving device 66a to receive the first communication light; a node light transmitting device 66b to transmit the second communication light; and a light pattern panel 62 having light emitting devices such as a plurality of light spots 64_1, 64_2, 64_3, 64_4 to produce the reference pattern 64. As such, the light transmitting device 52T and the light receiving device 52R are respectively aligned to the node light receiving device 66a and the node light transmitting device 66b. That is as described above, the light transmitting device 52T and the light receiving device 52R respectively are constantly set at the two relative locations with respect to the light identification device and are consistent with two relative locations of the node light receiving device 66a and the node light transmitting device 66b with respect to the reference pattern 64.

In an exemplary embodiment, as to the underwater communication method, the reference pattern 64 is implemented to comprise at least three light spots being distinct to one another, to form a polygon pattern.

In an exemplary embodiment, as to the underwater communication method, the polygon pattern has a geometric reference point, such as center point or centroid point, wherein the at least three light spots determine an orientation angle being relating to rotation.

In an exemplary embodiment, as to the underwater communication method, the geometric reference point is a center point or a centroid point of the polygon pattern.

In an exemplary embodiment, as to the underwater communication method, the polygon pattern is a right angle quadrilateral, taking a center point of the right angle quadrilateral as the geometric reference point.

In an exemplary embodiment, as to the underwater communication method, the power apparatus 56 drives the underwater communication apparatus 50, so that a detected reference point of the detection pattern 55 is aligned to the geometric reference point through movement, and the detection pattern 55 and the reference pattern 64 are in similar shape. Further due to rotation by the power apparatus 56, the detection pattern 55 is consistent with the orientation angle of the reference pattern 64.

In an exemplary embodiment, as to the underwater communication method, when the detection pattern 55 and the reference pattern 64 are similar in shape, as shown in FIG. 12 and FIG. 13, a depth of the underwater communication apparatus 50 is adjusted according to an area of the detection pattern 55.

In an exemplary embodiment, as to the underwater communication method, a range of the depth between a first depth having a resolution for allowing the at least three light spots to be distinct as shown in FIG. 12 and a second depth for the at least three light spots not crossing an image boundary in taking image during detection as shown in FIG. 13.

In an exemplary embodiment, as to the underwater communication method, each of the at least three light spots, as shown in FIG. 10, respectively transmits a distinct pulse beacon, so to identify the at least three light spots.

In an exemplary embodiment, as to the underwater communication method, the node communication apparatus 60 further comprises a monitor apparatus such as the underwater camera 70, the monitor apparatus communicates with the underwater communication apparatus 50 through the node light receiving device 66a and the node transmitting device 66b.

In an exemplary embodiment, as to the underwater communication method, wavelengths for the first communication light and the second communication light are different.

In an exemplary embodiment, as to the underwater communication method, the first communication light is green light and the second communication light is blue light.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An underwater communication apparatus, movable in a water environment to communicate with a node communication apparatus set at an underwater node, comprising:
   a light transmitting device, to transmit a first communication light;
   a light receiving device, to receive a second communication light;
   a light identification device, to detect a reference pattern in two dimensions, set on the node communication apparatus, to thereby obtain a detection pattern, wherein the light transmitting device and the light receiving device respectively corresponding to the light identification device are set at two relative locations;
   a power apparatus, to drive the underwater communication apparatus; and
   a control/monitor apparatus, to obtain the detection pattern from the light identification device and analyze a difference state between the reference pattern and the detection pattern, and control the power apparatus according to the difference state to move the underwater communication apparatus to a location for the detection pattern and the reference pattern being two dimensionally aligned.

2. The underwater communication apparatus of claim 1, wherein the location for the detection pattern and the reference pattern being two dimensionally aligned comprises a location alignment to a reference point and an orientation alignment with respect to the reference point.

3. The underwater communication apparatus of claim 2, wherein the detection pattern comprises a first pattern and a second pattern, wherein the light identification device comprises:
   a first imaging device, to obtain the first pattern by taking image at right down direction from the underwater communication apparatus; and
   a second imaging device, to obtain the second pattern by taking image at a slant direction with respect to the right down direction, used to look for the reference pattern,
   wherein the control/monitor apparatus determines a movement of the underwater communication apparatus according to a shape of the second pattern at a current time point, so to have the first pattern being effectively produced,
   wherein the location alignment after movement and the orientation alignment after rotation are involved between the first pattern and the reference pattern.

4. The underwater communication apparatus of claim 3, wherein the slant direction is in a range of 0 to 90 degrees.

5. The underwater communication apparatus of claim 1, wherein the node communication apparatus comprises:
   a node light receiving device, to receive the first communication light;
   a node light transmitting device, to transmit the second communication light; and
   a light pattern panel, having a plurality of light spots to produce the reference pattern,
   wherein the light transmitting device and the light receiving device are set at the two relative locations with respect to the light identification device and are consistent with two relative locations of the node light receiving device and the node light transmitting device with respect to the reference pattern.

6. The underwater communication apparatus of claim 1, wherein the reference pattern comprises at least three light spots being distinct to one another, to form a polygon pattern.

7. The underwater communication apparatus of claim 6, wherein the polygon pattern has a geometric reference point, wherein the at least three light spots determine an orientation angle being relating to rotation.

8. The underwater communication apparatus of claim 7, wherein the geometric reference point is a center point or a centroid of the polygon pattern.

9. The underwater communication apparatus of claim 7, wherein the polygon pattern is a right angle quadrilateral, taking a center point of the right angle quadrilateral as the geometric reference point.

10. The underwater communication apparatus of claim 7, wherein the power apparatus drives the underwater communication apparatus, so that a detected reference point of the detection pattern is aligned to the geometric reference point through movement, and the detection pattern and the reference pattern are in similar shape,
wherein due to rotation by the power apparatus, the detection pattern is consistent with the orientation angle of the reference pattern.

11. The underwater communication apparatus of claim 10, wherein when the detection pattern and the reference pattern are similar in shape, a depth of the underwater communication apparatus is adjusted according to an area of the detection pattern.

12. The underwater communication apparatus of claim 11, wherein a range of the depth between a first depth having a resolution for allowing the at least three light spots to be distinct and a second depth for the at least three light spots not crossing an image boundary in taking image during detection.

13. The underwater communication apparatus of claim 6, wherein each of the at least three light spots respectively transmits a distinct pulse beacon, so to identify the at least three light spots.

14. The underwater communication apparatus of claim 1, wherein the node communication apparatus further comprises a monitor apparatus, the monitor apparatus communicates with the underwater communication apparatus through the node light receiving device and the node transmitting device.

15. The underwater communication apparatus of claim 1, wherein wavelengths for the first communication light and the second communication light are different.

16. The underwater communication apparatus of claim 1, wherein the first communication light is green light and the second communication light is blue light.

17. An underwater communication method, used to communicate with a node communication apparatus set at an underwater node, the underwater communication method comprises:
providing an underwater communication apparatus;
driving the underwater communication apparatus to move in a water environment, so to relatively align to the node communication apparatus; and
performing a communication between the underwater communication apparatus and the node communication apparatus,
wherein the underwater communication apparatus comprises:
a light transmitting device, to transmit a first communication light;
a light receiving device, to receive a second communication light;
a light identification device, to detect a reference pattern in two dimensions, set on the node communication apparatus, to thereby obtain a detection pattern, wherein the light transmitting device and the light receiving device respectively corresponding to the light identification device are set at two relative locations;
a power apparatus, to drive the underwater communication apparatus; and
a control/monitor apparatus, to obtain the detection pattern from the light identification device and analyze a difference state between the reference pattern and the detection pattern, and control the power apparatus according to the difference state to move the underwater communication apparatus to a location for the detection pattern and the reference pattern being two dimensionally aligned.

18. The underwater communication method of claim 17, wherein the location for the detection pattern and the reference pattern being two dimensionally aligned comprises a location alignment to a reference point and an orientation alignment with respect to the reference point.

19. The underwater communication method of claim 18, wherein the detection pattern comprises a first pattern and a second pattern, wherein the light identification device comprises:
a first imaging device, to obtain the first pattern by taking image at right down direction from the underwater communication apparatus; and
a second imaging device, to obtain the second pattern by taking image at a slant direction with respect to the right down direction, used to look for the reference pattern,
wherein the control/monitor apparatus determines a movement of the underwater communication apparatus according to a shape of the second pattern at a current time point, so to have the first pattern being effectively produced,
wherein the location alignment after movement and the orientation alignment after rotation are involved between the first pattern and the reference pattern.

20. The underwater communication method of claim 19, wherein the slant direction is in a range of 0 to 90 degrees.

21. The underwater communication method of claim 17, wherein the node communication apparatus comprises:
a node light receiving device, to receive the first communication light;
a node light transmitting device, to transmit the second communication light; and
a light pattern panel, having a plurality of light spots to produce the reference pattern,
wherein the light transmitting device and the light receiving device are set at the two relative locations with respect to the light identification device and are consistent with two relative locations of the node light receiving device and the node light transmitting device with respect to the reference pattern.

22. The underwater communication method of claim 17, wherein the reference pattern comprises at least three light spots being distinct to one another, to form a polygon pattern.

23. The underwater communication method of claim 22, wherein the polygon pattern has a geometric reference point, wherein the at least three light spots determine an orientation angle being relating to rotation.

24. The underwater communication method of claim 22, wherein the geometric reference point is a center point or a centroid of the polygon pattern.

25. The underwater communication method of claim 22, wherein the polygon pattern is a right angle quadrilateral, taking a center point of the right angle quadrilateral as the geometric reference point.

26. The underwater communication method of claim 22, wherein the power apparatus drives the underwater communication apparatus, so that a detected reference point of the detection pattern is aligned to the geometric reference point through movement, and the detection pattern and the reference pattern are in similar shape,
wherein due to rotation by the power apparatus, the detection pattern is consistent with the orientation angle of the reference pattern.

27. The underwater communication method of claim 26, wherein when the detection pattern and the reference pattern are similar in shape, a depth of the underwater communication apparatus is adjusted according to an area of the detection pattern.

28. The underwater communication method of claim 27, wherein a range of the depth between a first depth having a resolution for allowing the at least three light spots to be distinct and a second depth for the at least three light spots not crossing an image boundary in taking image during detection.

29. The underwater communication method of claim 28, each of the at least three light spots respectively transmits a distinct pulse beacon, so to identify the at least three light spots.

30. The underwater communication method of claim 17, wherein the node communication apparatus further comprises a monitor apparatus, the monitor apparatus communicates with the underwater communication apparatus through the node light receiving device and the node transmitting device.

31. The underwater communication method of claim 17, wherein wavelengths for the first communication light and the second communication light are different.

32. The underwater communication method of claim 17, wherein the first communication light is green light and the second communication light is blue light.

* * * * *